United States Patent [19]

Moser

[11] 4,087,501
[45] May 2, 1978

[54] METHOD FOR THE CONTINUOUS PRODUCTION OF TUBULAR FOAMED PLASTIC PIPE SLEEVES INSULATING

[75] Inventor: Kurt Moser, Kirchheim, Germany

[73] Assignee: The Upjohn Company, Kalamazoo, Mich.

[21] Appl. No.: 650,190

[22] Filed: Jan. 19, 1976

[30] Foreign Application Priority Data

Jan. 28, 1975 Germany .............................. 2503425

[51] Int. Cl.$^2$ ............................................. B29D 27/04
[52] U.S. Cl. .................................. 264/45.8; 138/149; 138/156; 138/166; 264/46.4; 264/46.9; 264/250; 264/256; 264/269; 425/115; 425/371; 425/817 C; 428/36; 428/310
[58] Field of Search ....................... 264/51, 55, 42, 43, 264/46.2, 46.3, 45.8, 45.1, 46.9, 46.4, 250, 256, 269; 428/36, 175, 310; 138/149, 156, 166; 425/115, 371, 817 C

[56] References Cited

U.S. PATENT DOCUMENTS

| 1,751,430 | 3/1930 | Thomson | 264/42 X |
|---|---|---|---|
| 2,315,366 | 3/1943 | Daley et al. | 264/51 |
| 2,525,880 | 10/1950 | Feldman | 264/55 |
| 2,540,354 | 2/1951 | Selden | 264/42 |
| 3,020,587 | 2/1962 | Alderfer et al. | 264/45.8 X |
| 3,078,505 | 2/1963 | Mitten | 264/46.2 X |
| 3,126,035 | 3/1964 | Espetvedt | 138/166 X |
| 3,319,376 | 5/1967 | Doppelt et al. | 264/54 X |
| 3,413,389 | 11/1968 | Footner | 264/46.2 X |
| 3,429,956 | 2/1969 | Porter | 264/46.2 |
| 3,432,580 | 3/1969 | Heidrich et al. | 264/43 |
| 3,515,624 | 6/1970 | Garnbro | 264/43 X |
| 3,566,446 | 3/1971 | Ernst | 264/46.9 X |
| 3,657,036 | 4/1972 | Hullenhoff et al. | 264/46.2 X |
| 3,795,721 | 3/1974 | Gilbert et al. | 264/42 |
| 3,824,300 | 7/1974 | Raffenberg | 264/45.8 |
| 3,839,517 | 10/1974 | Maine | 264/42 |

FOREIGN PATENT DOCUMENTS

| 705,296 | 3/1965 | Canada | 264/54 |
|---|---|---|---|
| 688,679 | 6/1964 | Canada | 138/166 |
| 1,249,422 | 10/1971 | United Kingdom | 138/149 |

OTHER PUBLICATIONS

McKelvey; James M., "Polymer Processing," New York, John Wiley and Sons, 1962, pp. 1-5.
McKelvey; James M., "Polymer Processing," New York, John Wiley and Sons, 1962, pp. 228-235, 277, 278.

Primary Examiner—Philip Anderson
Attorney, Agent, or Firm—St. Onge, Mayers, Steward & Reens

[57] ABSTRACT

A method for the continuous production of completely or partly foamed thermosetting polymerizable plastic articles, such as pipe insulation shells or sleeves. One or more sets of justaposed mold-carrying endless conveyors are employed wherein one conveyor of each set supports a series of longitudinally contiguous mold halves complementary with a series of longitudinally contiguous mold halves supported by the other conveyor of the set. The conveyors are advanced simultaneously, and during the juxtaposed portion of travel define a laterally closed, longitudinally extended mold cavity which moves or advances. The cavity thus defined comprises a plurality of zones corresponding to tube segments extending longitudinally in side-by-side, substantially planar disposition, with thin hinge-forming channels interconnecting adjacent segment zones. A thermosetable foam-forming resin mix is distributed on to one of the complementary mold halves prior to closing of the mold cavity. The length of travel of the conveyor in closed-mold condition is designed to permit rising and curing of the resin material, at least to a condition such that the foamed article has sufficient physical integrity to be safely handled on discharge from the mold cavity. As discharged, the integrally hinged tube segments of the molded product are in substantially flat, planar disposition. This allows for a second operation to be performed on them, if desired, such as a further molding operation to incorporate a layer of foam-forming material of different physical properties than the first. In any case, whether one or more molded layers are involved, the product has the advantage for purposes of shipping or storage space economy of being flat and stackable, yet can be readily folded by articulating the integrally hinged tube segments to form the fully closed finished tubular article.

6 Claims, 11 Drawing Figures

METHOD FOR THE CONTINUOUS PRODUCTION OF TUBULAR FOAMED PLASTIC PIPE SLEEVES INSULATING

BACKGROUND OF THE INVENTION

Foamed hollow continuously cast articles are more particularly used as foamed material insulating tubes, that is to say more especially for thermal insulation on heating or cooling pipes. For the continuous production of foamed material insulating articles a method has been previously proposed in the case of which on to a rotating core body which is furthermore moved longitudinally, a basic material adapted to foam is applied, which can foam outwards freely, since on the outside no delimiting means are provided. This results in the disadvantage that insulating tubes of foamed material produced in this manner have an irregular outer surface and furthermore on fitting to a heating pipe must be encased in an additional covering foil. There is also the further disadvantage that the wall thickness of the foamed material tube is uneven.

Furthermore a device has been proposed comprising a stationary outer mold tube with a slot at the top, whose longitudinal slot serves for the introduction via a flat connecting piece of a cylindrical rod concentrically in such a manner that an annular channel is produced which at the top is interrupted by the connecting piece. On both sides adjacent to the connecting pieces the edges of inner and outer foils, necessary for tube production, are drawn from the outer mold tube upwards, where they are pressed by two conveying chains against the connecting piece and are moved in the longitudinal direction. Before the entry of the two foils into the molding channel the outer foil, which has previously been buckled outwards, is coated with a foam material mixture. On passage through the annular mold channel the foam material mixture foams and while pressing the outer foil against the inner wall of the outer mold tube and pressing the inner foil against the cylindrical core is forced through the annular molding channel. After emerging from the mold channel the excess foil edge portions which project to the outside are cut off and the tubular extruded article which is thus produced is cut up into suitable lengths. A disadvantage in the case of this method of production is more especially the considerable friction between the outer foil and the outer mold, since this limits both the length of the apparatus and therefore the speed of production and also the use of the materials coming into question, this being because high quality foaming materials produce higher reaction pressures on foaming. These reaction pressures are however limited as regards their upper limits, because an increase in the reaction forces simultaneously brings about a very pronounced increase in friction. A further disadvantage is due to the fact that there is only a restricted choice as regards the construction of the core . Another disadvantage is due to the fact that not only an outer foil but also an inner foil must be employed, which furthermore on the side adjacent to the core must be provided with a lubricant in order to keep friction within limits. This inner foil is only to aid manufacture, it is not required for later use of the foamed material tube as an insulating tube. Furthermore the inner foil leads to an unnecessary complication of the manufacturing process and therefore increases (the liability to breakdown of the installation.

Furthermore the German Pat. Specification (Auslegeschrift) No. 1,266,485 describes a continuous method in the case of which for the production of a longitudinally slotted foamed material insulating tube it is also necessary to employ an inner and outer foil. The two foils are so introduced to an annular molding chamber while being caused to bend in a tubular manner outwards that the outer foil comes to lie against the outer wall and the inner foil comes to lie against the inner wall formed by the core and shortly before entry of the foils into the molding chamber reactive material adapted to foam is introduced into the outer foil and it then immediately foams in the molding channel and becomes joined to the two foils. The molding channel is in this case formed by two circulating outer mold chains and the stationary core, which is attached to a crosspiece, which extends out of the space between the two outer mold chains through an upper joint or gap in an upward direction. In the case of this known method as well there are on the one hand the disadvantages already mentioned above, which are due to the use of an additional inner foil. Furthermore however there is more especially the disadvantage also that very pronounced frictional forces occur at the outer wall of the stationarily arranged core so that in the case of this known method as well the field of applicability is limited with respect to the speed of working, the cross-section of the parts to be produced and the choice of materials adapted to foam which can be employed.

The same also applies as regards another previously proposed apparatus, which has a stationary mandrel as an inner core, which is fixed at the inlet of the installation and extends freely into the stationary or circulating outer mold. Furthermore in the case of this installation it is also necessary to employ an inner foil, and in this case as well difficulties arise to a considerable extent as regards the friction produced. Such difficulties cannot be overcome by the use of additional lubricants. Furthermore there is the added disadvantage that the mandrel, which is only held at one end, is not sufficiently firmly positioned in order to resist the pressures occurring on foaming, without deflection.

Owing to the problem of the above mentioned deflection of the mandrel the proposal has been made in the case of another prior art installation (German Pat. Specification (Auslegeschrift) No. 2,165,584) of using a laser ray to check the deflection and using regulating and controlling elements to ensure proper alignment. By means of this auxiliary device it is however not possible to ensure any satisfactory alignment of the stationary inner core while on the other hand the whole installation becomes relatively complicated.

Furthermore a method and an apparatus have been proposed which depart from the method in accordance with the German Pat. Specification No. 1,266,485 in that it is not only the two outer mold chains but also the core which circulate, that is to say the core is not arranged in a stationary manner and instead is displaced pari passu with the two co-axial outer mold chains. This leads to the advantages of a substantial reduction of friction and a substantial increase in the speed of operation. However a further simplification of the method and of the apparatus would be desirable, together with provision for the possibility of production of multi-layer hollow continuously cast articles together with the possibility of providing the hollow cast article with various geometrical forms internally or externally as for example grooving. There is furthermore the disadvantages with all previously proposed methods and apparatus that the hollow cast articles must be subsequently separated into two half-shells, since half-shells are required for the simplest possible fitting on the pipes which are eventually to be insulated. Added to this in the prior art there has always been the disadvantage of undesired transfer of heat along the joint. There is also the disadvantage with previously produced insulating tubes that despite complete separation into the two half-shells they must be transported in the folded together condition since the half-shells are connected at least by a foil. The consequence of this is a larger requirement on storage and for transport.

The last mentioned disadvantage of a greater space requirement in the case of storage and transport is admittedly avoided in the case of another previously proposed method (French Pat. Specification No. 1,573,743) in the case of which the semi-cylindrical shells can be produced from polyurethane foam material by means of two conveyor belts arranged one above the other continuously, which have respective mold halves which lie against each other or fit into each other and so form a closed mold channel which can be displaced along a straight path and whose cross-section is semi-cylindrical. If the cross-section of the cast foam material article to be produced is complicated in shape, for example owing to the presence of undercuts, it is possible to provide a third conveyor belt in order to facilitate detachment of the conveyor belts from the cast foam article.

Although in the case of the above mentioned method friction can be kept relatively low there is however more especially the disadvantage that there is no possibility of producing hollow cast articles with a practically closed annular cross-section, for the cast articles have a semi-cylindrical or possibly rectangular cross-section. Furthermore fitting together of two semi-cylindrical shells to form one hollow cast article with a closed annular cross-section is neither intended (the aim of the invention is the production of cast articles with various solid cross-sections and not production of hollow cast articles) nor promising of success, since in this case it would firstly be necessary to produce in two working operations two semi-cylindrical shells and then the latter would have to joined together in a further working step. In this respect it would firstly not be possible to see how such a joint could be made in order to make possible later use as an insulating tube in the case of which the foam material tube must be opened up or unfolded to a certain degree for fitting but however after fitting is held together resiliently. In the case of a specific embodiment of this known method using a core string with spacers a continuously cast article is made, whose cross-section corresponds to three quarters of a circle. Apart from the fact that to this extent it is not possible to produce a hollow continuously cast article with an annular cross-section which is substantially closed, there is the shortcoming that the core string can only be removed again with comparative difficulty from the cast foamed polyurethane article after it has been produced, for this purpose the spacers must be separated from the core string. A further disadvantage resides in that the spacers cannot be removed from the cast foamed polyurethane article and remain in it. This furthermore has the disadvantageous consequence that at the inlet of the apparatus the core string must be constantly supplied with new spacers. Furthermore on the basis of the use of a core string which by its very nature is relatively thin and flexible it is not possible to produce a cavity with large radius. Furthermore the shaping of the cavity is very imprecise owing to the flexibility of the core string and the incomplete support by the spacers.

SUMMARY OF THE INVENTION

Taking the prior art so far described as a point of departure the present invention therefore has the aim of providing an improved method for carrying it out whereby the above mentioned shortcomings are remedied and the production of hollow continuously cast articles with a substantially annular cross-section is simplified(;) and furthermore further possibilities are to be opened up as regards the shaping of such hollow continuously cast articles, which relate to the production of hollow continuously cast articles with several different foam material layers and with a profiled joint. This objective is achieved in accordance with the invention by continuously casting two or more tubular segments which, as cast, are disposed in longitudinal, side-by-side, substantially planar relation with thin web-forming channels interconnecting respectively adjacent tubular segments, wherein the size and number of tubular segments is just sufficient to produce a thick-walled tubular insulating sleeve of smooth internal and external periphery when folded to envelope a pipe having a diameter equal to that of the inner diameter of the final tube or sleeve. This leads to the advantage that while avoiding any friction it is possible in a very simple and economic manner to continuously cast segmental tubular articles which in their ultimate application (for example as insulating tube) have an annular closed hollow cross-section, yet for storage and transport are in open, unfolded, substantially planar condition which minimizes the storage and shipping space requirements. Furthermore there is the advantage of simplif application of the article to its end use, since the article segments are connected together by a thin, integrally formed web or hinge tab between the adjacent segments, such that the article can be applied to a pipe to form an insulating sleeve therefor simply by folding the segments into encircling arrangement about the pipe.

In accordance with a preferred embodiment of the invention after the introduction of a first material layer into the mold a second, possibly different material layer is introduced on top of the first layer. In this manner it is possible for the first time to produce continuously multi-material cast tubular articles in an extremely simple manner whereby optimum insulating properties and furthermore the widest applications are ensured.

In accordance with another preferred embodiment of the invention before the introduction of a self-foaming mix of polymeric material into the mold half- or part-shells of heat resistant material are so arranged in the mold that their edges lie in the parting plane of the mold or are offset with respect to it.

In accordance with another preferred embodiment of the invention, in the parting plane surface of the segments of the article to be cast, single or multiple mortises and tenons are produced by providing corresponding complementary formations along the longitudinal edges of the mold elements defining the molding cavity. This leads to the advantages of a reduction of any thermal bridges in the use of insulating tubes and an improvement in holding together of the foamed continuously cast sleeves when placed on a pipe to be insulated.

The apparatus utilizes in accordance with the invention for carrying out the method is characterized in that a set of upper and lower juxtaposed mold-carrying endless conveyors respectively support and articulate a series of contiguous mold halves which are complementary of each other when brought into confronting relation during the juxtaposed portion of their travel to define a laterally closed, longitudinally extended, mold cavity through said juxtaposed portion of their travel. The cavity thus formed defines a plurality of tubular segments disposed longitudinally of the conveyor travel in side-by-side, substantially planar relation with thin web-forming channels interconnecting respectively adjacent tubular segments. The size and number of said segments is just sufficient to produce a thick-walled tubular insulating sleeve of smooth internal and external periphery when folded to envelope a pipe having a diameter equal to that of the inner diameter of the finished tube or sleeve.

A preferred embodiment of the apparatus in accordance with the invention is characterized in that the mold halves are respectively arranged in a detachable manner on the endless transport means used in forming the continuously cast segments.

In order to provide a more detailed explanation of the invention reference is had to the following description of preferred embodiments which are shown diagrammatically in the accompanying drawings.

Figure 1:
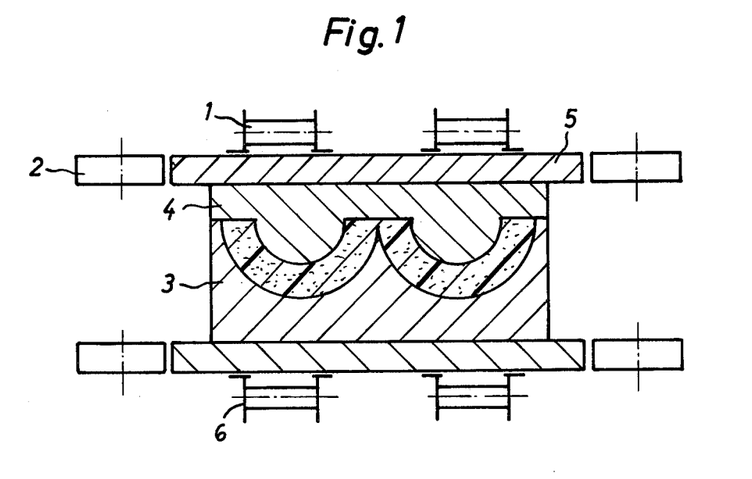
FIG. 1 shows two mold halves in confronting relation, together with conveyor means for supporting and advancing them.
Figure 2:
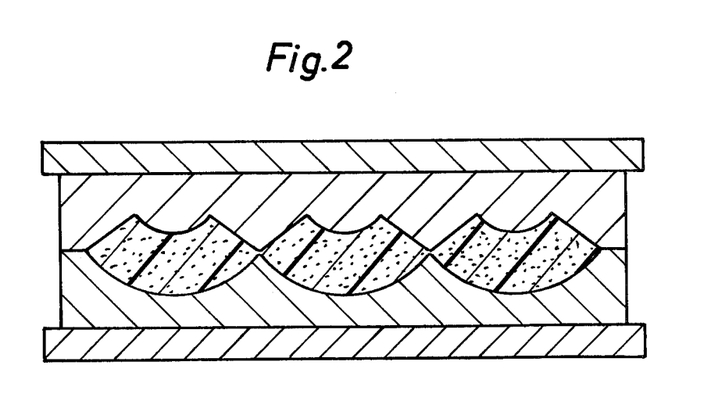
FIG. 2 shows two mold halves used in continuously casting a tubular sleeve comprised of three segments.
Figure 3:
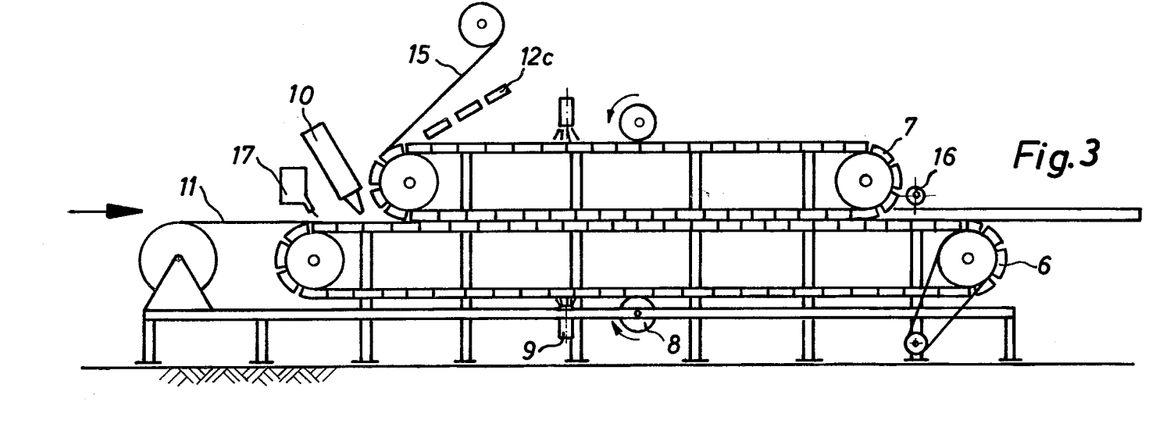
FIGS. 3 and 3A show a side and plan view of an apparatus for carrying out the method in accordance with the invention.
Figure 3A:
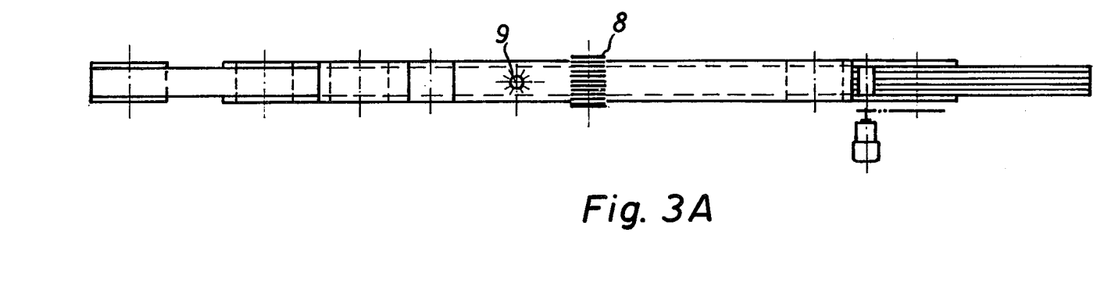

In accordance with FIGS. 1, 2 and 3 two series of upper and lower mold halves are provided, which are divided longitudinally into individual articulated elements and which move with a suitable speed, driven by a conveying means 1 in the transport means 6 and 7 along a straight line. The individual elements when pressed close together during the juxtaposed portion of their travel along their respective conveyors form the necessary moving hollow mold, and outside the production zone are turned and returned in a conventional manner. Other than a simple mechanical guide 2, indicated generally in FIG. 1, no complicated adjusting, guiding, sensing and gripping means are required. The mold elements 3 and 4 can be replaced for changing the form of the articles to be cast and are attached by screwing or clamping means in a conventional manner on the carrying elements 5.

The individual cast sleeve or tube segments resulting from the continuous casting process are joined laterally by a thin web of the foamed-in material, which is produced at the position of the joint owing to a thin gap being left between the respective lower and upper elements of mold halves 3 and 4. This web operates as a hinge on folding together the tubular segments to enclose a pipe to be insulated. By the additional introduction of a covering foil 11 in a conventional manner, which is often demanded for covering the tubes, a further advantage results in that the foil acts as additional reinforcement of the hinge.

As shown specifically in FIGS. 1, 2 and 3 the lower mold halves 3 are taken up by the transport means 6 and the upper mold halves 4 are taken up by the transport means 7. The two mold halves (3 and 4) are cleaned in a conventional manner by the devices 8 and 9 and provided with parting or demolding agent. By means of a dispensing device 10 the thermosettable polymerizable mix is metered out either directly into the mold half 3 or on to a foil 11. Owing to the relatively simple transport means (since it only comprises two endless belt or chain conveyor means) which runs pari passu with the foamed article, it is possible to carry out production with a relatively high speed.

Figure 4:
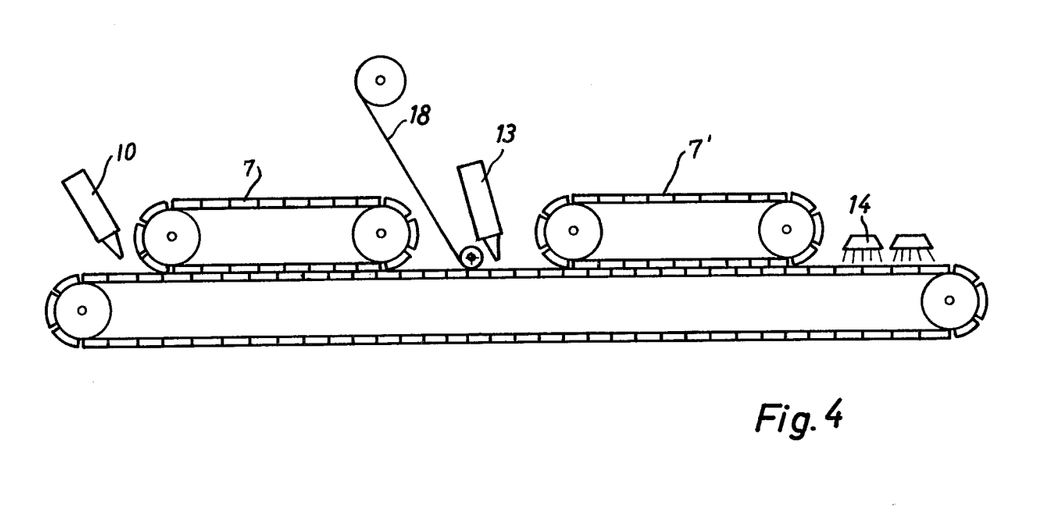
FIG. 4 shows another embodiment of the apparatus.
Figure 5:
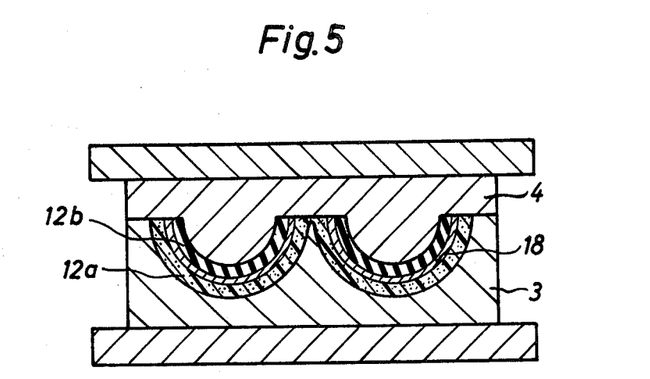
FIG. 5 shows two mold halves with multi-layer segments of the hollow cast article.

Owing to the open manner of production, the hollow cast article can be produced with two or more layers, indicated by 12a and 12b in FIG. 5 in a continuous manner. This method of production has previously only been used in manual setting operations on site in the case of insulation of constructions or bodies with a high temperature. In the method described here as shown in FIG. 4 two or more compositions can be introduced one after the other, which, adapted with specific means, have different properties. Furthermore the second component introduced by dispensing head 13, or further components similiarly introduced in sequence, can be of a material which is far more refractory (for example resisting temperatures of 800° C or more), than is the case with conventional foam mixes. Such refractory materials may include for example minerals, ceramic materials, aluminium silicate, asbestos foam and the like. Conventionally such materials in the cured condition are porous and friable, with little capacity for self-support and therefore not readily transported in the form of lengths of tubular segments or sleeves of a size adapted for pipe insulation purposes. However, this becomes possible where such refractory materials are employed as linings supported by the polymeric foam material. In the application of the refractory linings to the foam support, a heating source 14 may be provided to expedite removal of water or other solvents from the refractory composition where this is applied as a damp slurry or paste.

In the case of this sandwich technology the transport means consists of two or more units 7, 7′ which all run at the same speed as the lower transport 6, and only the shape of the upper mold halves 4 is changed as successive layers are formed, in order to accommodate the change in configuration of the molded product.

Figure 6:
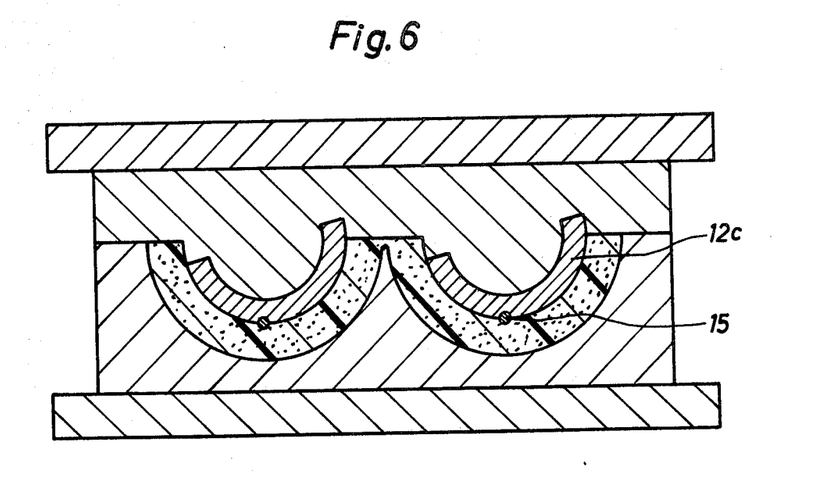
FIG. 6 shows two mold halves with premolded shell elements.

In a modified arrangement illustrated in FIGS. 3 and 6, lengths of premolded half-shells 12c of refractory material are fed into the mold cavity by placing them sequentially in upper mold halves 4 during the return portion of their travel. (See particularly FIG. 3.) In order to maintain these shells in their proper position in the upper mold halves until the self-foaming plastic mix is introduced, a temporary support, such as wire 15, is employed. The placement of the shells 12c may be such as to dispose their longitudinal edges coincident with the edges of the foam segments, or they may be circumferentially offset therefrom as shown more particularly in FIG. 6. Thus the arrangement just described makes possible the continuous production of multi-layer insulating sleeves which are so segmented as to provide an offset of the respective layers which enhances the thermal impedence of the completed sleeve by avoiding the thermal bridges spoken of heretofore. Temporary support strands 15 will of course be severed simultaneously with severing the continuous cast product into desired lengths.

Figure 7:
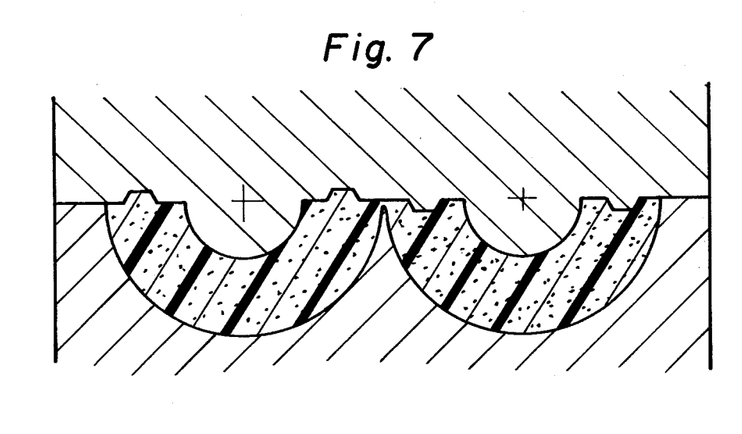
FIGS. 7 and 7A show continuously cast tubular segments of a sleeve in unfolded condition, with different mortise and tenon configurations in their longitudinal edges.
Figure 7A:
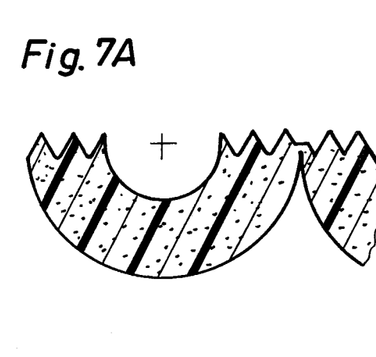
Figure 8:
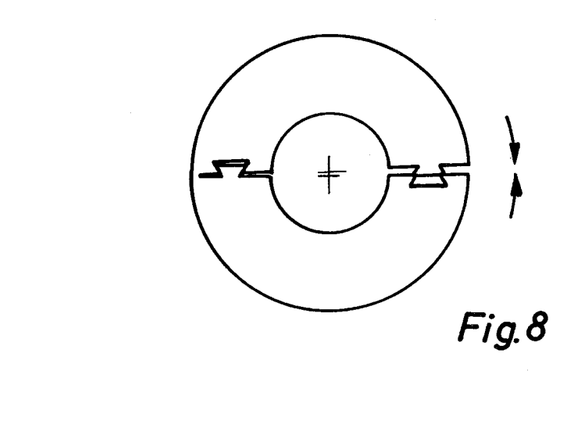
FIG. 8 is an end view of a sleeve or tube formed by folding adjacent tubular segments together, with a modified form of mortise and tenon being here illustrated from those shown in FIGS. 7 and 7A.

In contrast to all previously proposed methods of production in this case at the contact faces of the shell segments tongue and groove formations can be produced during the foaming operation so as to provide tenons and mortises in accordance with FIG. 7. On which on folding together, the segments fit into each other and in the above described manner impede the passage of heat. Furthermore, they may be formed with undercuts as shown in FIG. 8 to act as detents, in the case of which the degree of undercutting only has to be selected in such a manner that the mold halves 4 can leave the molded article without damaging it at the rear point of deflection or guidance of the transport means 7 and simultaneous demolding with the use of a hold down 16 (FIG. 3).

Owing to the production of a hollow continuously cast article in a folded-open condition, the shell parts are not deformed or squashed on folded together into the closed position so that an unstressed insulating body is produced which makes even engagement at the parting plane; i.e., the inner and outer peripheries of the finished sleeve are smooth and substantially uninterrupted.

Since in the case of this method no protective film or foil need be used but the latter, if it is to be used, can be adapted exactly to the contours of the mold part 3 before the introduction of the raw material for foaming and for surrounding the outer periphery of the hollow extruded article the film or foil only has to lie against a single row 3 of mold parts. It is therefore possible to produce hollow cast articles, which have any desired shape, that is to say including shapes with deep transverse ribs, both externally and also internally. This can be carried out either by the continuous shaping of a smooth film or foil in accordance with known means as used for blister packing production; or by pouring a liquid film or foil material which solidifies before introduction of the raw foaming material, as is indicated by the casting or pouring means 17 as shown in FIG. 3.

Figure 9:
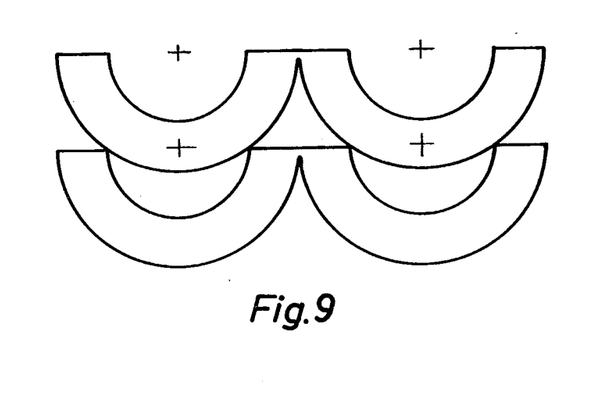
FIG. 9 shows the stacking for transport of the hollow shells in accordance with the invention.

The production of the hollow extruded articles in the folded-open condition makes possible storage and transport of the parts in this form, in contrast to previously proposed methods, because in the case of the latter owing to the practically closed manner of production the extruded articles only retain their open form as long as they are pressed open manually or with special devices. More particularly in the case of large cross-sections of tubes to be insulated, in the case of which on storage the ratio of empty air-space to material becomes more and more unfavourable, it is possible to make a substantial saving in storage space, if the hollow extruded articles are sold in the commercially acceptable form as shown in FIG. 9.

In the case of the production of multi-layer insulating bodies it is additionally possible to introduce a foil strip 18 in accordance with FIGS. 4 and 5 between the individual insulating layers in order to check fire or to provide a vapor barrier.

I claim:

1. A method of making tubular foamed plastic pipe insulating sleeves and the like in continuous length which comprises the steps of simultaneously advancing a first set of upper and lower juxtaposed mold-carrying endless conveyors respectively supporting and articulating two series of contiguous mold halves which are complementary of each other when brought into confronting relation during the juxtaposed portion of their travel to define a laterally closed, longitudinally extended, mold cavity through said juxtaposed portion of their travel, said cavity defining a plurality of tubular segments disposed longitudinally of the conveyor travel in side-by-side, substantially planar, relation with thin web-forming channels intercommunicating respectively adjacent tubular segments, wherein the size and number of said segments is just sufficient to produce a thick-walled tubular insulating sleeve of smooth internal and external periphery when folded to envelope a pipe having a diameter equal to that of the inner diameter of the sleeve;

dispensing a thermosettable foam-forming material on one of said series of mold halves prior to the closing of the mold;

advancing said closed mold cavity with said foam-forming material therein to allow said material to fill said mold cavity and to become sufficiently cured to be self-supporting;

causing said conveyors to diverge at the end of said juxtaposed portion of their travel to separate said two series of mold halves and cause discharge from said mold cavity of said tubular segments integrally joined by thin webs, wherein as discharged said segments are aligned laterally in substantially planar disposition but which are articulatable along said integrally formed webs to permit hinging said segments to complete said tubular foamed plastic insulating sleeves.

2. The method defined in claim 1, wherein the insulating sleeve segments discharged from said first set of mold-carrying conveyors are advanced to a second combination of juxtaposed conveyors defining a second mold cavity similar to the first but superimposed on said sleeve segments, dispensing a second settable material into said second mold cavity to form a layer of said second material on said first segments, said second mold cavity being sized in relation to said first segments to produce a laminated sleeve of smooth internal and external periphery when folded to envelope a pipe having a diameter equal to that of the inner diameter of said laminated sleeve.

3. The method defined in claim 2, wherein prior to dispensing said second settable material, a foil is introduced into said second mold cavity to form an integrated partition between said first and second layers of settable materials.

4. The method defined in claim 1, wherein rigid preformed shell segments of heat resistant material equal in number of said tubular segments, are disposed on and supported by said upper mold conveyor in corresponding relation to said tubular segments, and are advanced into said mold cavity with the introduction of said foam-forming material, whereby integrally to imbed said shell segments in said tubular segments.

5. The method defined in claim 1, wherein said upper series of mold halves are provided with complementary mortise and tenon formations extending along opposite longitudinal edges of said tubular segments formed by said complementary mold halves.

6. The method defined in claim 1, wherein prior to dispensing said thermosettable foam-forming material onto one of said series of mold halves, a foil strip is introduced to line said mold halves.

* * * * *

UNITED STATES PATENT OFFICE
CERTIFICATE OF CORRECTION

Patent No. 4,087,501         Dated   May 2, 1978

Inventor(s)  Kurt Moser

It is certified that error appears in the above-identified patent and that said Letters Patent are hereby corrected as shown below:

In the Title, change "x x x Plastic Pipe Sleeves Insulating" to -- Plastic Pipe Insulating Sleeves --.

In the Abstract, line 4, change "justaposed" to -- juxtaposed --.

Column 2, line 68 through column 3, line 1, change "disadvantages" to -- disadvantage --.

Column 4, line 13, after "annular" insert -- closed --.

Column 4, line 14, change "simplified(;)" to -- simplified; -- .

Column 4, line 38, change "simplif" to -- simplified --.

Column 5, line 1, change "utilizes" to -- utilized --.

Column 6, line 33, after "more" insert -- foam --.

Column 6, line 56, after "more" insert -- separate --.

UNITED STATES PATENT OFFICE
CERTIFICATE OF CORRECTION

Patent No. 4,087,501  Dated May 2, 1978

Inventor(s) Kurt Moser

It is certified that error appears in the above-identified patent and that said Letters Patent are hereby corrected as shown below:

Column 7, line 19, delete "which on".

Column 7, line 31, change "folded" to -- folding --.

Signed and Sealed this

Thirteenth Day of February 1979

[SEAL]

Attest:

RUTH C. MASON
*Attesting Officer*

DONALD W. BANNER
*Commissioner of Patents and Trademarks*